(12) United States Patent
Ruel et al.

(10) Patent No.: US 11,718,230 B2
(45) Date of Patent: Aug. 8, 2023

(54) MIRROR ASSEMBLY FOR AUTONOMOUS MANEUVERS

(71) Applicant: Muth Mirror Systems, LLC, Sheboygan, WI (US)

(72) Inventors: Jeff A. Ruel, Greenland, NH (US); Pat C. Miller, Milford, MI (US); Dan J. Mathieu, Sheboygan Falls, NJ (US)

(73) Assignee: Muth Mirror Systems, LLC, Sheboygan, WI (US)

( * ) Notice: Subject to any disclaimer, the term of this patent is extended or adjusted under 35 U.S.C. 154(b) by 647 days.

(21) Appl. No.: 16/846,744

(22) Filed: Apr. 13, 2020

(65) Prior Publication Data
US 2020/0331390 A1     Oct. 22, 2020

Related U.S. Application Data

(60) Provisional application No. 62/834,660, filed on Apr. 16, 2019.

(51) Int. Cl.
*B60R 1/00*       (2022.01)
*B60R 16/023*     (2006.01)
*B60R 1/12*       (2006.01)

(52) U.S. Cl.
CPC ............ *B60R 1/006* (2013.01); *B60R 1/1207* (2013.01); *B60R 16/0231* (2013.01); *B60R 2001/1215* (2013.01); *B60R 2001/1284* (2013.01)

(58) Field of Classification Search
CPC ... B60R 1/006; B60R 16/0231; B60R 1/1207; B60R 2001/1215; B60R 2001/1284; B60Q 1/011; B60Q 1/2665; B60Q 2400/20
USPC ................................. 359/839; 362/494, 612
See application file for complete search history.

(56) References Cited

U.S. PATENT DOCUMENTS

| | | | |
|---|---|---|---|
| 5,938,320 A * | 8/1999 | Crandall | B60R 1/1207 362/478 |
| 6,045,243 A | 4/2000 | Muth et al. | |
| 6,264,353 B1 * | 7/2001 | Caraher | B60Q 1/2665 340/475 |

(Continued)

OTHER PUBLICATIONS

Search Report and written opinion for PCT Application No. PCT/US20/27925 dated Jul. 16, 2020.

(Continued)

*Primary Examiner* — Ricky D Shafer
(74) *Attorney, Agent, or Firm* — James A. Joyce; Godfrey & Kahn, S.C.

(57) ABSTRACT

A mirror assembly for use with mirror housing on autonomous or semi-autonomous vehicle, including a reflector for collecting and distributing emitted light to a plurality of icon regions, a circuit board, a plurality of light sources mounted to the circuit board and positioned to selectively emit light to illuminate the icon regions, wherein the circuit board provides selective illumination of the icon regions via the light sources in response to one or more received signal inputs from the vehicle indicating an imminent autonomous vehicle maneuver, a mirror having a front surface and a rear surface, wherein the reflector is secured at least indirectly to the rear surface and a plurality of icons visible along a driver viewing axis relative to the front surface of the mirror during illumination, wherein the plurality of icons are positioned over the icon regions to allow for selective icon illumination via a selected icon region.

21 Claims, 6 Drawing Sheets

(56) References Cited

U.S. PATENT DOCUMENTS

| | | | |
|---|---|---|---|
| 6,592,230 | B2 | 7/2003 | Dupay |
| 7,008,091 | B2 | 3/2006 | Mathieu et al. |
| 7,717,596 | B1 * | 5/2010 | Bell ................ B60Q 1/381 |
| | | | 362/800 |
| 8,325,055 | B2 | 12/2012 | Uken et al. |
| 8,708,536 | B1 | 4/2014 | Mathieu |
| 9,440,580 | B2 | 9/2016 | Mathieu et al. |
| 9,761,144 | B2 | 9/2017 | Huizen et al. |
| 9,783,113 | B2 | 10/2017 | Toth et al. |
| 9,969,326 | B2 | 5/2018 | Ross et al. |
| 2005/0265037 | A1 * | 12/2005 | Newton ............ B60R 1/1207 |
| | | | 362/494 |
| 2006/0012990 | A1 * | 1/2006 | Walser ............ G02B 6/4298 |
| | | | 362/494 |
| 2006/0192665 | A1 | 8/2006 | Song |
| 2012/0147613 | A1 * | 6/2012 | Goldschmidt ...... G02B 6/0001 |
| | | | 362/494 |
| 2012/0206930 | A1 * | 8/2012 | Minikey, Jr. ........ B60R 1/12 |
| | | | 362/494 |
| 2014/0320277 | A1 * | 10/2014 | Foote ............... B60Q 1/0076 |
| | | | 359/872 |
| 2016/0078768 | A1 * | 3/2016 | Huizen ............ B60R 1/1207 |
| | | | 340/435 |
| 2016/0368419 | A1 * | 12/2016 | Toth ................. B60R 1/078 |

OTHER PUBLICATIONS

SAE International—"Automated Driving Systems (ADS) Lighting—AVSR GRE Task Force Summary" allegedly published Dec. 2018.
Screen captures from YouTube video clip entitled "BLIS® with Trailer Coverage and Cross-Traffic Alert | Ford How-To | Ford," 3 pages, uploaded on Apr. 14, 2020. Retrieved from Internet: < https://www.youtube.com/watch?v=pGvXi1Bse78> Allegedly Posted by Ford Motor Company—Feb. 12, 2017.
Screen captures from YouTube video clip entitled "2019 Ram 1500—Top 5 Hidden Features!," 1 page, uploaded on Apr. 14, 2020. Retrieved from Internet: https://www.youtube.com/watch?v=bOPsfea4mkw. Allegedly Posted by Bachman Auto Group—Jul. 10, 2019.
Infineon Bcr 401U E6327 Datasheet (pub. Jan. 28, 2015).
2015 part drawing of a commercially available three-bar sequential turn signal module design.
2015 part drawing of a commercially available three-bar sequential turn Signal mirror module design for Honda Goldwing Motorcycle.
2007 part drawing of a commercially available bi-color Signal mirror assembly design for a Toyota Tacoma.
2007 part drawing of a commercially available LH Reflector with Stand Alone baffles design.
European Search Report for corresponding patent application No. 20790847.6 dated Dec. 13, 2022.

* cited by examiner

MIRROR ASSEMBLY FOR AUTONOMOUS MANEUVERS

CROSS-REFERENCE

This application is based on U.S. Provisional Patent Application Ser. No. 62/834,660 filed on Apr. 16, 2019, of which priority is claimed and the disclosure of which is incorporated herein by reference for all purposes.

FIELD OF THE INVENTION

The mirror assembly for autonomous maneuvers relates generally to the field of transportation vehicles. More particularly, the mirror assembly for autonomous maneuvers relates to information displays for vehicles.

BACKGROUND

Vehicles have traditionally utilized one or more exterior side rearview mirrors to assist a driver with operating the vehicle. The side rearview mirror serves multiple purposes beyond just rear vision. For example, it can serve as a platform for turn signals, puddle lights, and blind spot indicators. It also is easily adjustable, intuitively useful, and gives the driver a 1:1 scale view. As such, modern side rearview mirrors often provide an information display zone that has become an important part of the driver's panoramic view and driving experience.

While exciting, fully autonomous driving is unlikely to make a significant volume impact on roadways for many years due to a lack of technology maturity, high cost, and unresolved safety concerns. A more significant trend to impact vehicle design and production over the coming years will be the continued evolution of human centered driver assistance systems whereby the driver retains responsibility, but transitions between pilot and co-pilot roles in harmony with the automation system. In all cases the driver must remain vigilant to traffic in adjacent lanes utilizing side rearview mirrors. This makes the side rearview mirror a natural and critical place to display human machine interface information relative to automated lane change maneuvers. Put in other words, such systems operate just below the boundary of Level 3 automation.

Many vehicles currently incorporate Advanced Driver-Assistance Systems (ADAS), which are electronic systems that assist the vehicle driver while driving or during parking. Such systems can include blind spot detection (BDS), lane departure warning, etc. In some cases, these systems can be utilized by a vehicle when to assist with autonomous and semi-autonomous maneuvers, while in other cases they can operate independently to provide a driver information regardless of any autonomous and semi-autonomous features that may be installed on a vehicle.

SUMMARY OF THE INVENTION

In at least some embodiments, a mirror assembly for use within a mirror housing on an autonomous or semi-autonomous vehicle is provided that includes: a reflector for collecting and distributing emitted light to a plurality of icon regions; a circuit board; a plurality of light sources mounted to the circuit board and positioned to selectively emit light to illuminate the icon regions, wherein the circuit board provides selective illumination of the icon regions via the light sources in response to one or more received signal inputs from the vehicle indicating an imminent autonomous vehicle maneuver; a mirror having a front surface and a rear surface, wherein the reflector is secured at least indirectly to the rear surface; and a plurality of icons visible along a driver viewing axis relative to the front surface of the mirror during illumination, wherein the plurality of icons are positioned over the icon regions to allow for selective icon illumination via a selected icon region.

In at least some other embodiments, a mirror assembly for use within a mirror housing on an autonomous or semi-autonomous vehicle is provided that includes: a reflector at least partially divided by baffle walls, and including converging facets and refocusing facets, wherein the combination of baffle walls, converging facets, and refocusing facets provide a plurality of icon regions, and wherein at least two icon regions are not completely separated from each other by baffle walls; a circuit board; a plurality of light sources mounted to the circuit board and positioned to selectively illuminate the icon regions, wherein the circuit board provides selective illumination of the icon regions via the light sources in response to one or more received signal inputs from the vehicle indicating an imminent autonomous vehicle maneuver; a mirror having a front surface and a rear surface, wherein the reflector is secured at least indirectly to the rear surface; and a plurality of icons visible along a driver viewing axis relative to the front surface of the mirror during illumination, wherein the icons are positioned over the icon regions to allow for selective icon illumination via a selected icon region.

In at least yet some other embodiments, a mirror assembly for use within a mirror housing on a vehicle with an advanced driver assistance system is provided that includes: a reflector for collecting and distributing emitted light to a plurality of icon regions; a circuit board; a plurality of light sources mounted to the circuit board and positioned to selectively emit light to illuminate the icon regions, wherein the circuit board provides selective illumination of the icon regions via the light sources in response to one or more received signal inputs from the vehicle; a mirror having a front surface and a rear surface, wherein the reflector is secured at least indirectly to the rear surface; and a plurality of icons visible along a driver viewing axis relative to the front surface of the mirror during illumination, wherein the plurality of icons are positioned over the icon regions to allow for selective icon illumination via a selected icon region, wherein at least one of the icons is a trailer icon and wherein the trailer icon is illuminated when both a trailer is coupled to the vehicle and when the vehicle detects via the advanced driver assistance system that an obstacle is in a blind spot detection zone of the vehicle.

Other embodiments, aspects, and features of the assembly will be understood and appreciated upon a full reading of the detailed description and the claims that follow.

BRIEF DESCRIPTION OF THE DRAWINGS

Embodiments of the assembly are disclosed with reference to the accompanying drawings and are for illustrative purposes only. The assembly is not limited in application to the details of construction or the arrangement of the components illustrated in the drawings. The assembly is capable of other embodiments or of being practiced or carried out in other various ways.

DETAILED DESCRIPTION

For clarity, any reference to autonomous vehicles is intended to include fully and partially (semi) autonomous vehicles. Autonomous vehicles can include various piloted driving features, for example, an automated lateral move or lane change. Such a maneuver is notably more complicated than just automated braking or adaptive cruise control, and therefore impending autonomous and semi-autonomous maneuvers to be performed by the vehicle should be communicated intuitively to the driver with an effective interface so that the driver has notice of the expected action by the vehicle. This interface will necessarily be more complex than many of the displays and warnings currently in a vehicle and requires inventive display techniques. The outside rearview mirror of a vehicle is an ideal location for such an interface as it provides a display zone easily visible to the driver, but it presents challenges not seen with simple turn signals or blind spot warnings currently being displayed through the mirror glass of vehicle mirrors. While signaling in multiple directions through a common ablated aperture on a vehicle mirror is taught in U.S. Pat. No. 7,008,091 and refocusing and converging rays from a single or multiple electromagnetic emitters is taught in U.S. Pat. Nos. 8,708,536 and 9,440,580, the disclosures of which are incorporated herein, these patented assemblies retain numerous deficiencies with regard to overcoming the challenges of the complex interface with regard to autonomous vehicles, such deficiencies being overcome by the subsequently disclosed embodiments.

Figure 1:
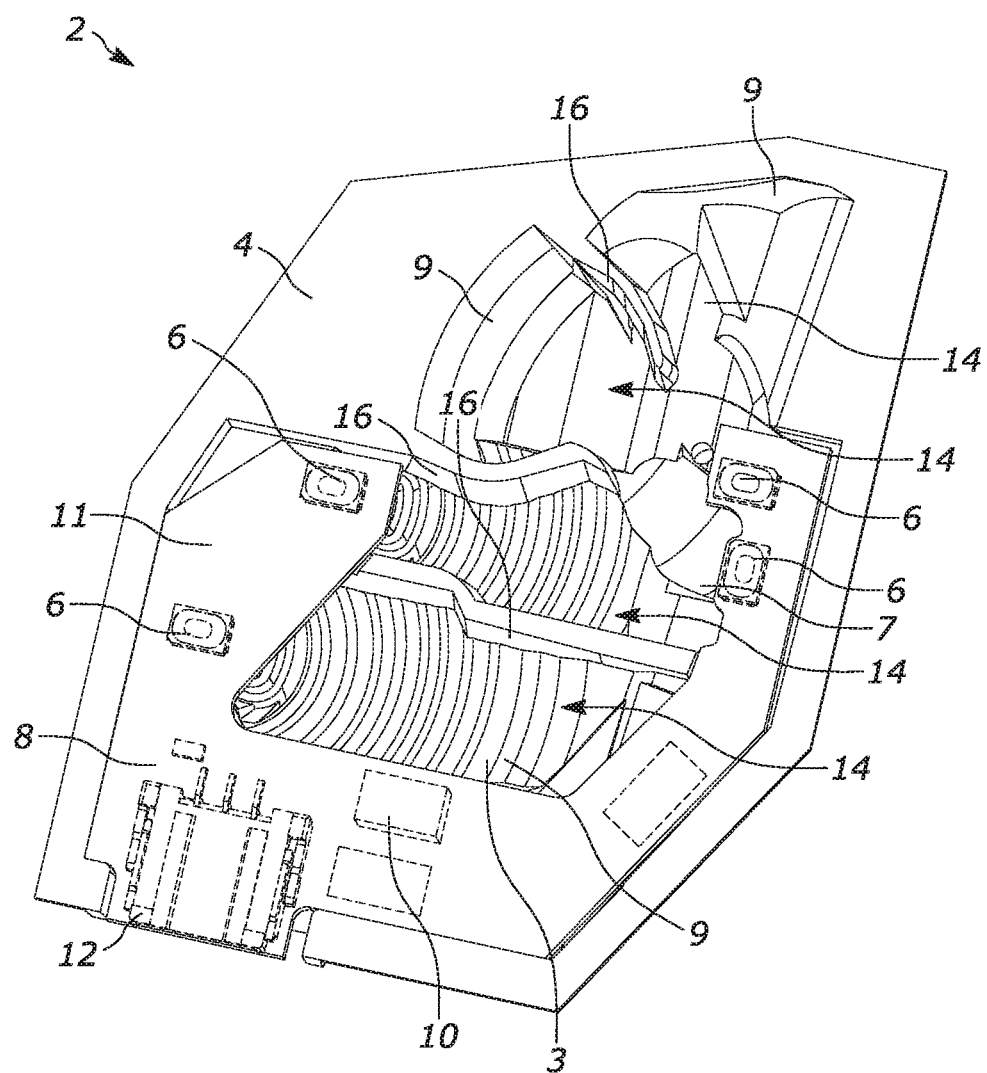
FIG. 1 is a top perspective view of an exemplary optic assembly.

Referring to FIG. 1, an exemplary optic assembly 2 is shown. In at least some embodiments, and as shown, the optic assembly 2 can include a reflector 4 and one or more light sources 6, which in at least some embodiments can be installed on a circuit board 8. Suitable light sources can include a variety of devices capable of emitting light, such as LEDs. In at least some embodiments, LEDs are a preferred light source due to their relatively small size, low heat emission, and low power consumption. Phosphor-converted LEDs can be particularly advantageous. The light source(s) are generally enclosed inside the optic assembly 2. Although the optic assembly 2 is shown with four LEDs, it should be understood that the quantity of LEDs can vary more or less. The reflector 4 includes an inner surface 3 that in at least some embodiments, can include a plurality of refocusing facets 7 and converging facets 9 formed in the reflector 4 to direct light from the light sources 6 in a desired direction. The circuit board 8 can further include one or more circuit components, such as a sequencing integrated circuit 10 for controlling illumination of the light sources 6, and a circuit board connector port 12 for coupling the circuit board 8 with a vehicle's electrical system. The reflector 4 can be at least partially divided to contribute to a plurality of icon regions 14 that in at least some embodiments include chambers that can be enclosed, partially enclosed, or partially overlapping within the reflector 4. The reflector can also include refocusing facets 7 and/or converging facets 9, which serve to direct light and also contribute to the icon regions 14. A plurality of baffle walls 16 can be provided in the reflector 4 to also contribute to the icon regions 14 by directing and/or blocking light within the icon regions 14. In at least some embodiments, the icon regions 14 are partially enclosed by the baffle walls 16, but not completely enclosed, in such embodiments, the facets 7, 9 direct the light from the light source 6 in a manner that does not illuminate an icon 25 associated with an adjacent icon region 14. In at least some embodiments the baffle walls 16 can be formed from the facets 7, 9 or portions extending therefrom, and as such are not required to be sharply divergent elements. In at least some embodiments, the icon regions 14 are only partially defined by the reflector 4 itself, while in other embodiments, the reflector 4 configuration contributes only marginally to the icon regions 14 while other overlaying components contribute principally to the icon region 14, as discussed in detail below. The circuit board 8 includes a top side 11 and a bottom side 13, wherein in at least some embodiments, the light sources 6 are mounted on the bottom side 13 to face downward into the facets 7, 9.

Figure 2:
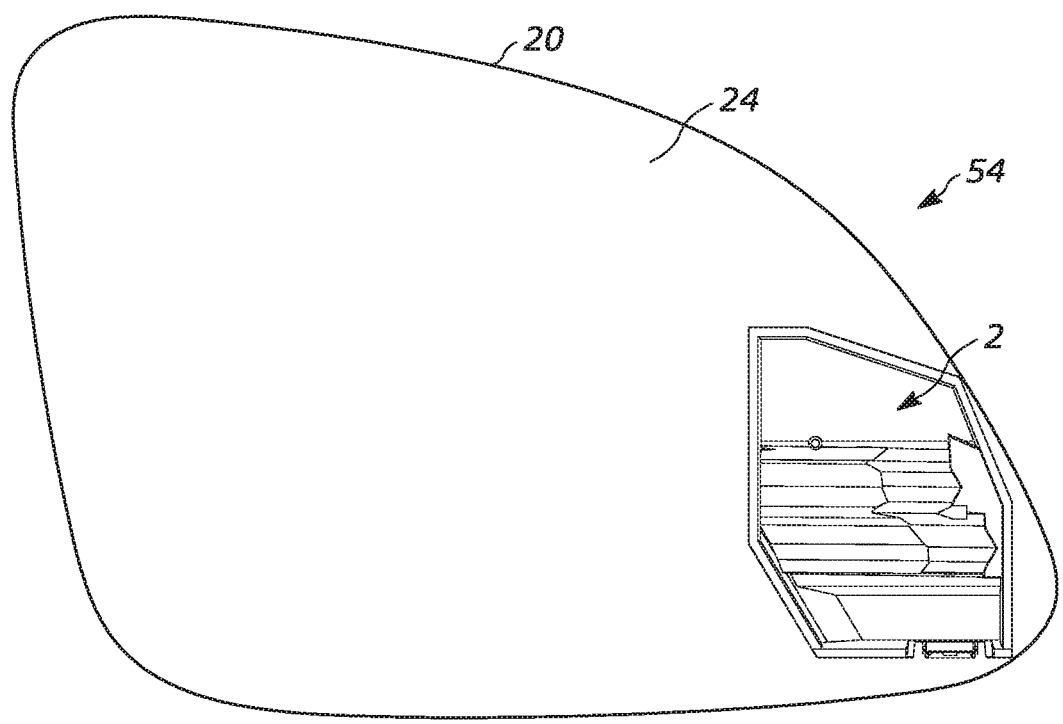
FIG. 2 is a rear view of an exemplary mirror with the optic assembly.
Figure 3:
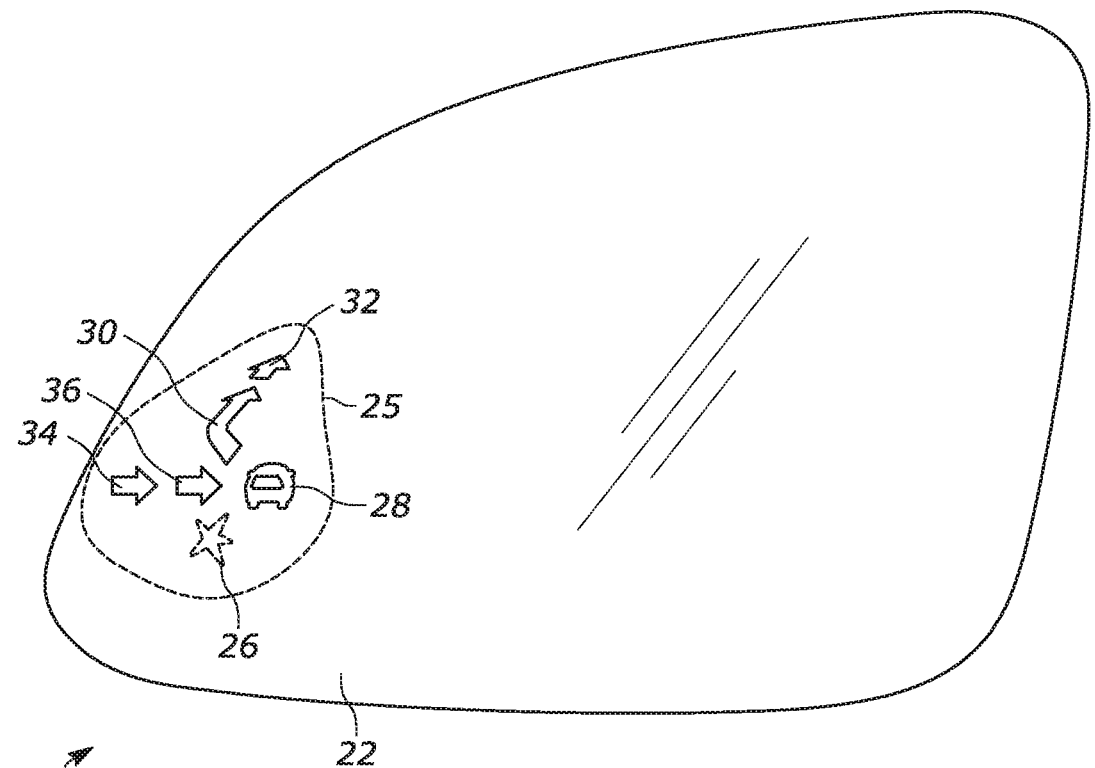
FIG. 3 is a front view of the mirror of FIG. 2.

The optic assembly 2 is configured to be secured to a mirror. Referring to FIGS. 2 and 3, rear and front views of an exemplary mirror 20 with the optic assembly 2 secured thereto are provided. The mirror 20 includes a front surface 22 and a rear surface 24, wherein the optic assembly 2 is secured at least indirectly to the rear surface 24. The mirror 20 can be used as part of a vehicle mirror and can be coated with a variety of mirror coatings, such as a thin chrome coating as described in U.S. Pat. No. 6,045,243, laser ablated chrome, dichroic, silver, an electrochromic mirror coating, etc.

A plurality of illuminable icons 25 are provided, that at least when illuminated, are visible to a driver through the front surface 22 of the mirror 20. In at least some embodiments, these icons 25 can be formed solely in the mirror 20 via full or substantial ablation of a reflective coating applied to the front surface 22 or rear surface 24 of the mirror 20, while in other embodiments, at least some of the icons 25 can be formed in other components, as discussed below, and are merely visible through ultra-fine ablations in the mirror 20. Regardless of where the icons 25 are formed, when the optic assembly 2 is secured behind the mirror 20, the icons 25 are positioned over selective icon regions 14 to allow for selective illumination of each icon 25 by chosen light sources 6. In at least some embodiments, although the icon regions 14 may not be fully enclosed, light from a designated light source 6 is directed within the icon region 14 using one or more of the facets 7, 9 and the baffle walls 16, such that the light does not illuminate or substantially illuminate an icon 25 in an adjacent icon region 14. In this manner, each icon region 14 can be associated with a specific icon 25 intended for illumination.

Figure 4:
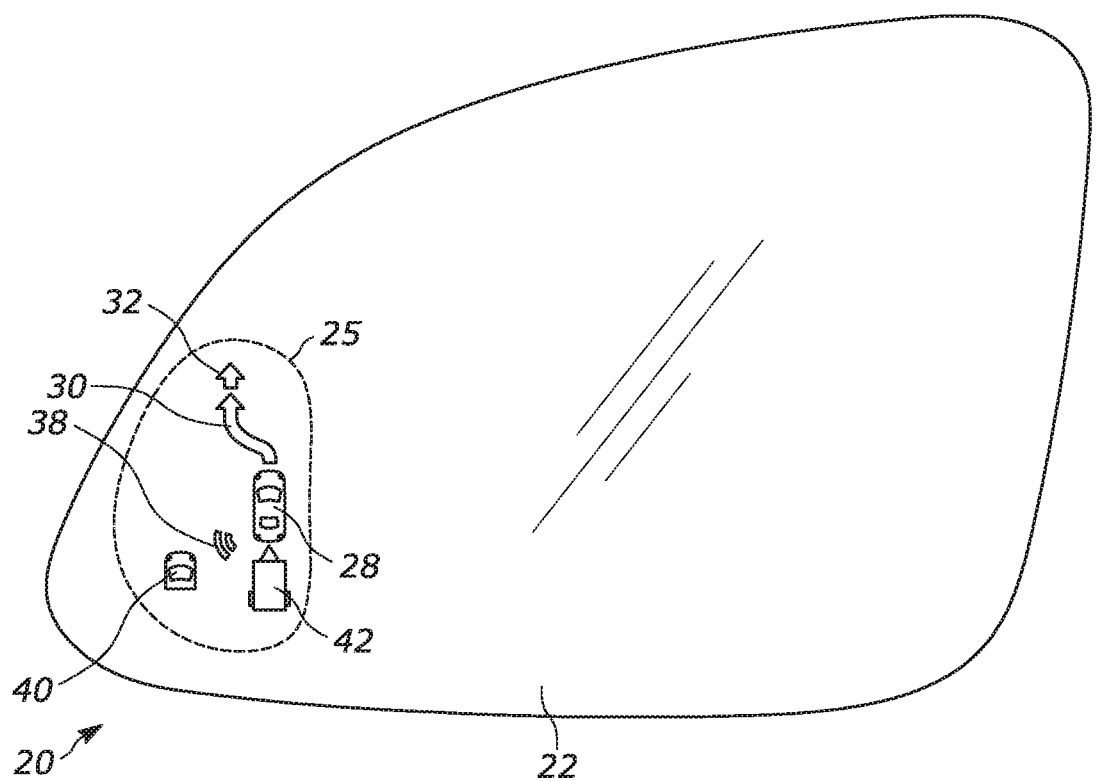
FIG. 4 is a front view of another exemplary mirror with the optic assembly.

The icons 25 can take on various shapes and sizes, such as a warning star icon 26, a base car icon 28, an initial lane change icon 30, a progressive lane change icon 32, cross traffic warning arrow icons 34, 36, etc. It is noted that the exemplary optic assembly 2 is shown to include icon regions 14 and light sources 6 for some of the aforementioned icons 25, although, more or less icon regions 14 and light sources 6 can be provided to accommodate more or less icons 25. The exemplary warning star icon 26 and cross traffic warning arrow icons 34 and 36 are shown with dashed lines in the figures to indicate that in at least some embodiments, a covert ultra-fine ablation can be utilized so that these icons are only readily visible when illuminated and therefore less confusing when combined with fully ablated icons. The icons 25 illustrated are exemplary, as the size, shape, and orientation can vary as desired. For example, as seen in FIG. 4, the icons 25 can utilize an ISO style icon design, and further, can include additional icons, such as a sensor wave icon 38, a side object icon 40, and a trailer icon 42.

Figure 5:
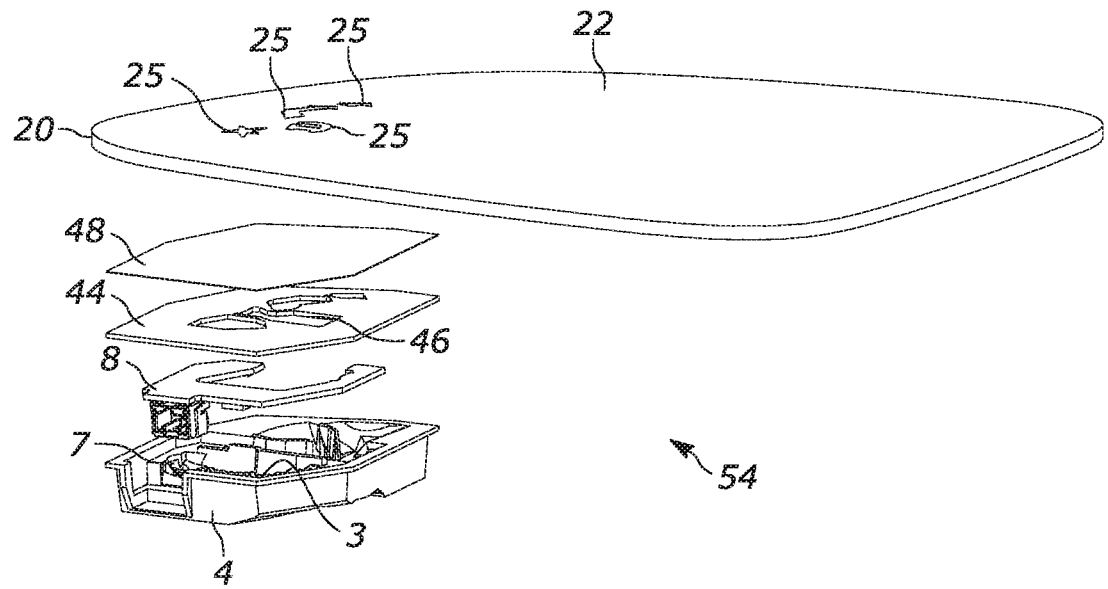
FIG. 5 is a top perspective exploded view of a mirror assembly that includes the optic assembly and mirror.
Figure 6:
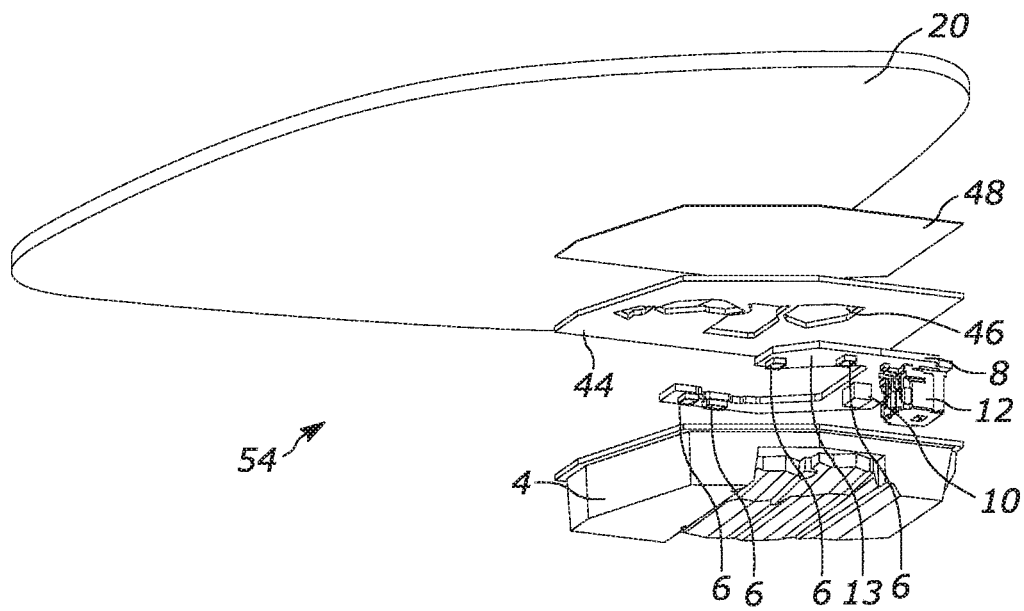
FIG. 6 is a bottom perspective exploded view of the mirror assembly of FIG. 5.

Interfacing the optic assembly 2 with the mirror 20 can be performed in various manners. Referring to FIGS. 5 and 6, exploded perspective views of one embodiment of the optic assembly 2 and mirror 20 are provided, wherein a gasket 44 is provided for positioning at least partially over the circuit board 8 and reflector 4. The gasket 44 blocks portions of the outward emission of light from the reflector 4, except where a plurality of gasket apertures 46 are situated. Generally, a select gasket aperture 46 is placed about a select icon region 14 in order to provide selectable illumination to the icon 25 associated with the select icon region 14. In this manner the selective powering of a light source 6 can illuminate a specific icon 25. In at least some embodiments the gasket 44 can be comprised of a polyethylene and acrylic PSA material. Although the icon regions 14 can be at least partially defined by facets 7, 9 and/or baffle walls 16, in at least some embodiments, the reflector 4 may omit baffle walls 16 such that the icon regions 14 are defined predominantly by converging facets 9 and/or refocusing facets 7 and the gasket apertures 46, while in other embodiments baffle walls 16 may be omitted along with one or both of converging facets 9 and refocusing facets 7.

In addition to the gasket 44, a diffuser 48 can be utilized to spread or scatter light and provide a more uniform appearance, wherein the diffuser 48 can be positioned between the mirror 20 and the gasket 44. In at least some embodiments, the diffuser 48 is comprised of polycarbonate with in at least some embodiments, an acrylic adhesive, and/or a polyethylene carrier. For illustrative purposes, the icon portion of the mirror 20 is shown positioned above the optic assembly 2, gasket 44, and diffuser 48. As noted above, the optic assembly 2 is secured to the rear surface 24 of the mirror 20. The gasket 44 and diffuser 48 can take many forms and can be integral or separate components. In at least some embodiments, the gasket 44 can be formed from an adhesive (e.g., polyethylene and acrylic PSA material) and used to secure the optic assembly 2 at least indirectly to the mirror 20, while in other embodiments, a mask is provided that can alone or in combination with the gasket 44, be used for securement, wherein the mask can at least in part be comprised of an adhesive.

As the gasket 44 and diffuser 48 are positioned between the optic assembly 2 and the mirror 20, they can in at least some embodiments be used alone or in combination, to in whole or in part, form the visible icon 25. In at least some embodiments, if the icon 25 is formed at least in part by the gasket 44, one or more gasket apertures 46 can be shaped (e.g., aligned) to match the desired icon 25 shape (or can be oversized to a degree) so as to allow the desired illuminated icon to be projected through the gasket 44 and therefore be visible from the front surface 22 of the mirror 20. In at least some embodiments, if the icon 25 is formed at least in part by the diffuser 48, the icon 25 or an outline of the icon 25 is printed on the diffuser 48, such that those portions are highlighted by the illumination underneath and visible from the front surface 22 of the mirror 20. In at least some embodiments, the icon 25 represents the outwardly visible indication that is seen on the front surface of the mirror 20 by a seated driver when the icon 25 is illuminated and can be formed in whole or in part by the mirror 20, the gasket 44, and the diffuser 48. When positioned over the reflector 4, the mirror 20, the gasket 44, and/or the diffuser 48 can each form part of the icon region 14.

Figure 7:
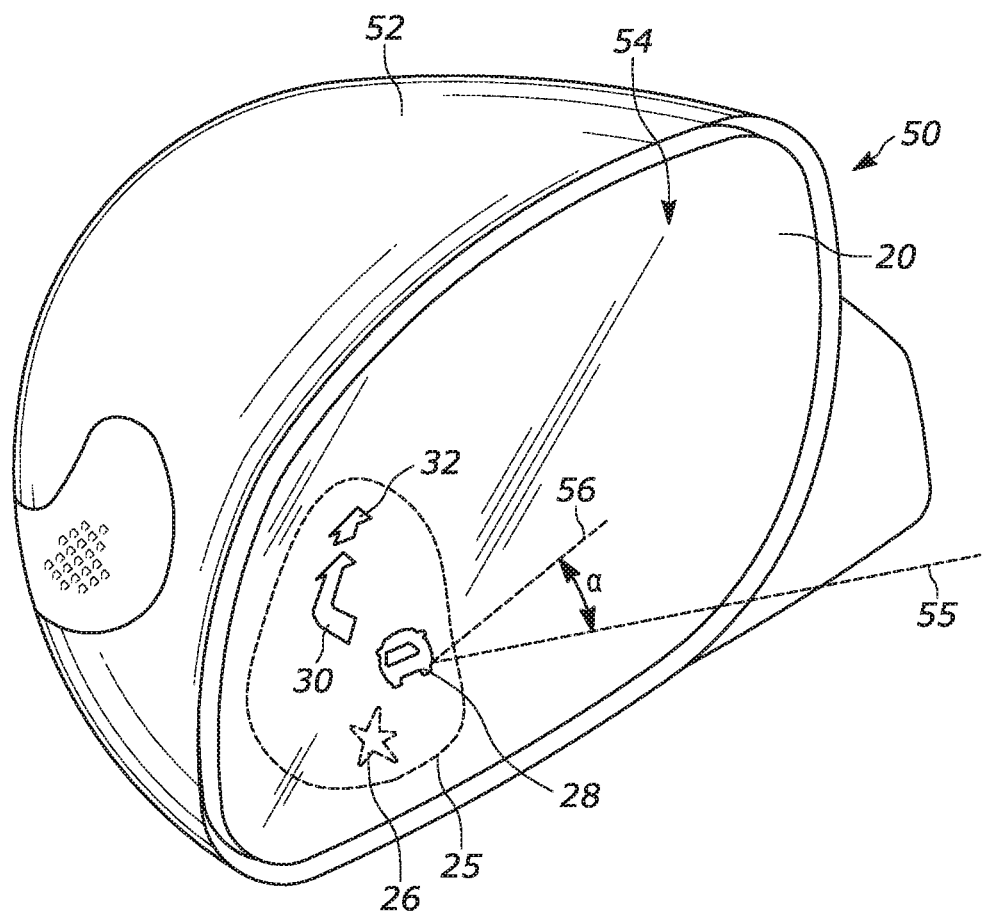
FIG. 7 is a perspective view of the mirror assembly of FIG. 5 installed inside a mirror housing for mounting on a vehicle.

The optic assembly 2 is configured for use with a vehicle. FIG. 7 illustrates an exemplary side mountable rearview vehicle mirror 50 that includes a mirror housing 52 that houses the mirror 20 with the optic assembly 2 secured to the rear surface 24 of the mirror 20. The optic assembly 2 is configured to be secured to the mirror 20 to form a mirror assembly 54. In at least some embodiments, the optic assembly 2 can be mounted to other types of vehicle mirrors, such as an interior rear view mirror, or other vehicle location. Although the optic assembly 2 is shown in use with the mirror 20, optic assembly 2 can also be used with other types of substrates in other applications, such as transparent and semitransparent substrates. The mirror assembly 54 is positioned to allow a driver to see the desired icons 25. More particularly, as seen in FIG. 7, a driver viewing axis 55 is shown that extends at an angle α relative to the front surface 22 of the mirror 20 (a front surface axis line 56 is shown for illustrative purposes). Although the angle α can vary, it is in at least some embodiments between about 40 degrees and about 80 degrees. The driver viewing axis 55 is considered the line of sight for a driver of a vehicle while the driver is looking at the mirror assembly 54. In at least some embodiments, the angle α indicates that a driver's view of the mirror assembly 54 while in use is not perpendicular to the front surface 22.

The optic assembly 2 can be utilized to provide various types of notifications to a driver based on signal inputs generated by the vehicle. Some types of notifications can be related to autonomous maneuvers performed by the vehicle. In at least some situations, autonomous maneuvers, such as a lane change, can require a vehicle to first notify (annunciate to) the primary driver (pilot) that the maneuver is forthcoming. As the maneuver gets closer to occurring, the vehicle can provide an indication to the driver that they are about to be relegated to co-pilot status and the vehicle is about to autonomously move. In at least some embodiments, this communication can occur by the vehicle sending signal inputs to the optic assembly 2 notifying the driver of an impending autonomous maneuver so that the optic assembly 2 can perform sequential illumination of various icons 25 (sequential icon illumination feature). For example, the sequential icon illumination can include lighting the following icons 25 sequentially: base car icon 28, initial lane change icon 30, and progressive lane change icon 32, then base car icon 28 and initial lane change icon 30 together, and finally the base car icon 28, initial lane change icon 30, and progressive lane change icon 32 altogether. The speed of this sequencing can be ramped up in proportion to how imminent the maneuver is.

Figure 8:
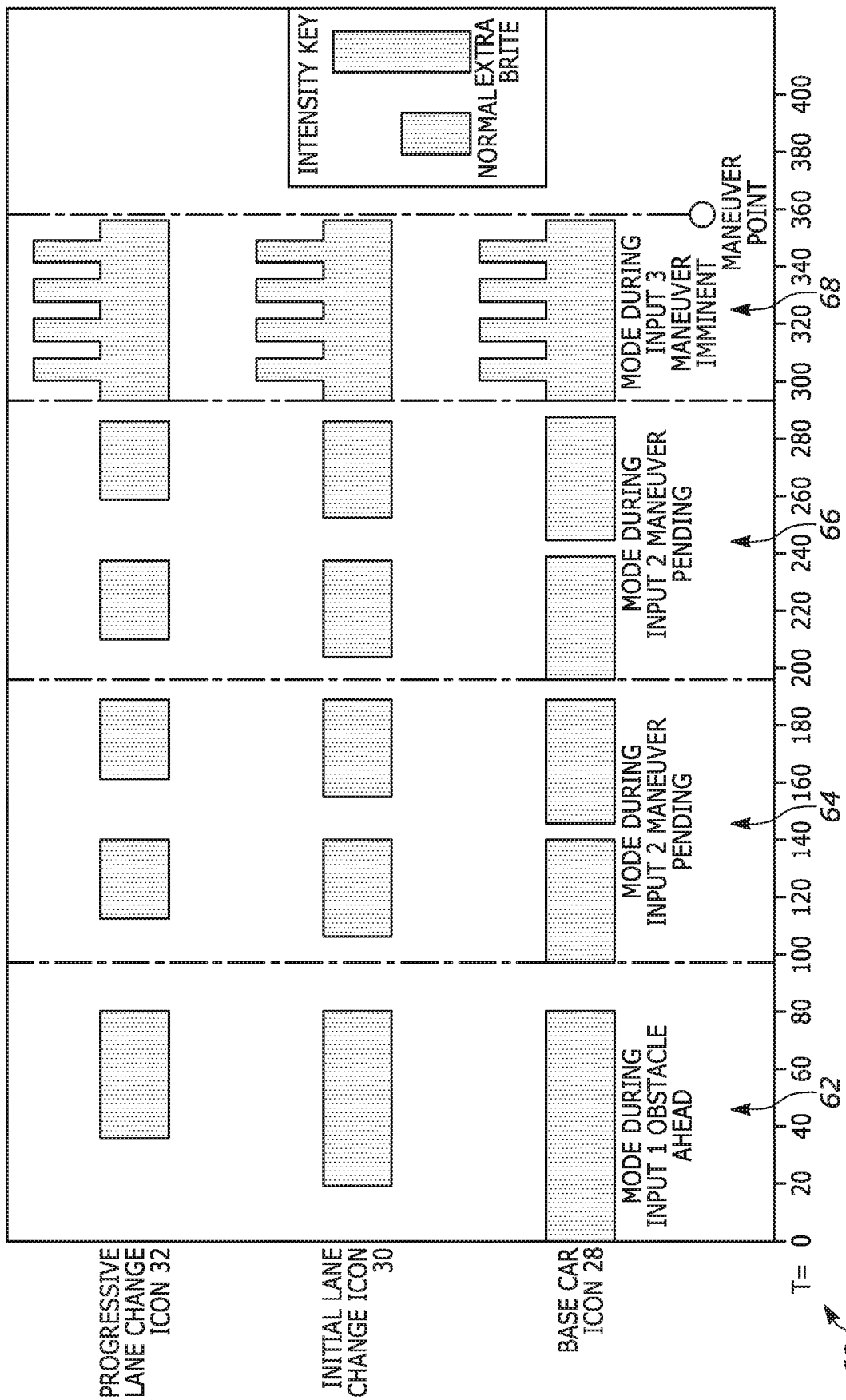
FIG. 8 is an exemplary table illustrating a graphical timing sequence for illuminating various icons of the mirror assembly.

Referring to FIG. 8, table 60 illustrates an exemplary sequential icon illumination for the icons 28, 30, and 32 when the vehicle is going to perform an autonomous lane change to avoid an obstacle. As seen in the table 60, a first timed sequence 62 is performed when the optic assembly 2 receives a signal input from the vehicle indicating that an obstacle has been detected requiring an autonomous evasive maneuver to be performed. Beginning at T(time)=0, the base car icon 28 alone is illuminated for 18 milliseconds followed by the additional illumination of the initial lane change icon 30 for 18 more milliseconds followed by the additional illumination of the progressive lane change icon 32, leaving all three icons illuminated for an additional 44 milliseconds, then all icons off for 18 milliseconds for a total cycle of 98 milliseconds. As the maneuver is pending and becomes more imminent the cycles could change, leading to a second timed sequence 64, wherein the base car icon 28 is illuminated for 7 milliseconds followed by illumination of the initial lane change icon 30 for 7 milliseconds, followed by the additional illumination of the progressive lane change icon 32, leaving all three icons illuminated for 28 milliseconds, then all off for 7 milliseconds, then repeat the same pattern for a total of 98 milliseconds for the second timed sequence 64. This timing can be repeated multiple times, such as shown in a third timed sequence 66. This ramped illumination can include a fourth timed sequence 68 that includes a rapid flashing of all three icons 28, 30, 32 in unison and alternating between a normal and higher intensity that continues until the autonomous vehicle maneuver is performed. This ramping sequential format displayed via the mirror assembly 54 keeps the co-pilot fully apprised of what the vehicle is attempting and when it is attempting it. Other timing and order sequences can be performed. In at least some embodiments, any of the timed sequences can be repeated, omitted, or otherwise modified. The timing of illumination, as well as the specific icons illuminated can be varied to annunciate specific autonomous maneuvers. In at least some embodiments, the sequential icon illumination for autonomous maneuvers can be performed for maneuvers initiated at least in part by the driver.

In at least some embodiments, one or more of the light sources 6 can include a bi-color LED. For example, the light source 6 that lights the base car icon 28 can selectively illuminate in amber or red to provide additional differentiation between blind spot warning and a lane change indicator. Another color, such as teal, may additionally be used to indicate an autonomous mode maneuver. Further, in at least some embodiments, the aforementioned sequential icon illumination can be controlled at least partially by controls on the circuit board 8, such as resistors, capacitors, and transistors, or the sequencing integrated circuit 10, such that only a triggering signal input for the sequencing or flashing rate is provided by a varying signal from the vehicle, while in other embodiments the sequencing can be performed via signal inputs from a separately mounted integrated circuit or controller. In at least some embodiments, the signal input is generated by a vehicle's advanced driver-assistance system (ADAS) or yet another source from the vehicle. The sequencing integrated circuit 10 can in at least some embodiments be a model no. BCR 401U E6327 (SC-74 configuration) as manufactured by Infineon Technologies of Munich Germany, or a similar device. The sequencing integrated circuit 10 can communicate using various vehicle communication protocols, such as CAN Bus, LIN Bus, Flexray, Automotive Ethernet, or other systems later developed. In addition to or in place of the integrated circuit 10, various other types of controllers can be utilized to provide and/or adjust the timing, signals, output, etc.

Other features such as cross traffic warning can be added to the mirror assembly 54 and can be further differentiated with similar or different sequential rates and color mixing. For example, the base car icon 28 could come on in amber and the cross traffic arrow icons 34, 36 (see FIG. 3) could come on in red. In at least some embodiments a bi-color light source for the base car icon 28 could be moved inboard and acted on by appropriate refocusing and converging facets 7, 9 in such a manner that two outboard mounted light sources (not shown) could be added to illuminate two sequential cross traffic arrow icons 34, 36.

In some embodiments, the autonomous activity performed by the vehicle may not be a maneuver, but rather an adjustment of the blind spot sensor range, such as may be required when a trailer is added to the vehicle. In such a case the baffle walls 16, bi-color features, and or sequential flashing can be utilized to provide an additional icon such as a trailer icon 42 (see FIG. 4) to let the driver know that the sensing range is extended to include the area beside the trailer. The trailer icon 42 can be illuminated when the vehicle has autonomously detected that a trailer has been coupled to the vehicle and/or when a manual selection has been performed by a driver using a vehicle interface (an OEM interface) to indicate to the vehicle that a trailer is or will be coupled to the vehicle. If the vehicle has autonomously detected the coupling of a trailer or been manually informed of the coupling by the driver, then when the vehicle autonomously detects an obstacle in a blind spot detection zone of the vehicle the trailer icon 42 can be illuminated.

Figure 9:
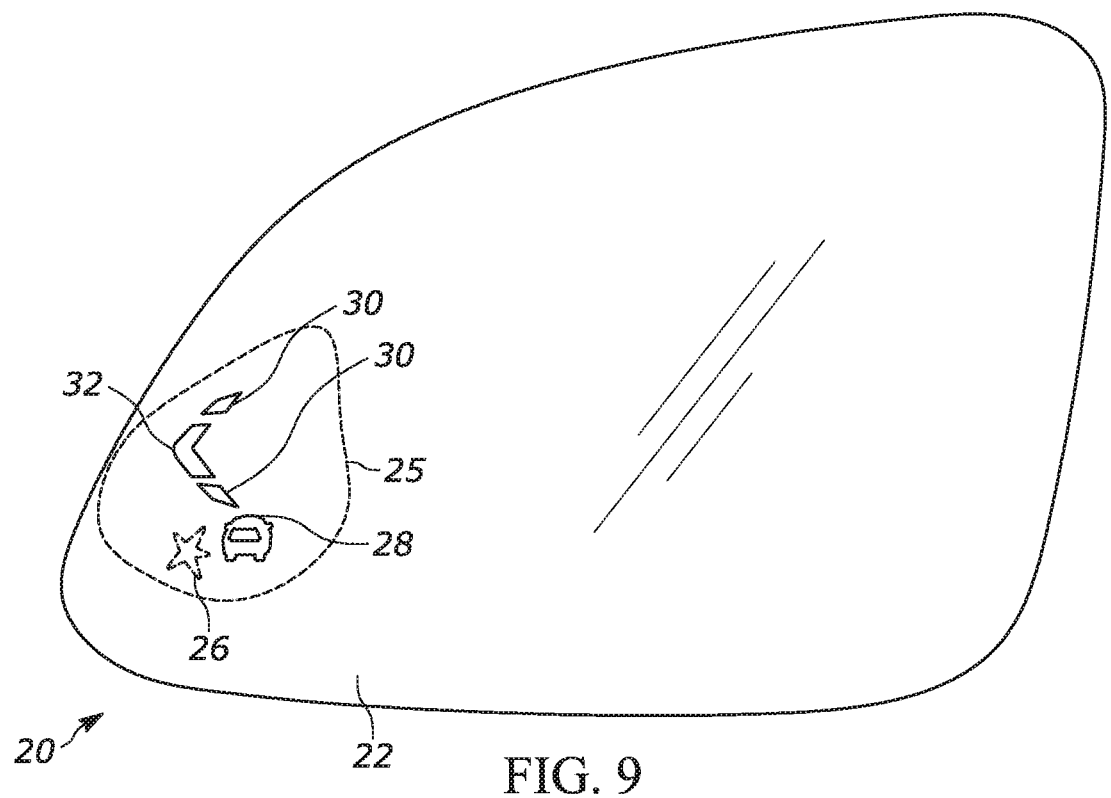
FIG. 9 is a front view of another embodiment of the mirror of FIG. 2.

Further, in at least some embodiments, the initial lane change icon 30 and the progressive lane change icon 32 can take the form of a turn signal chevron. For example, as illustrated in the mirror of FIG. 9, the initial lane change icon 30 can include two portions positioned over and under the progressive lane change icon 32. As discussed above, the initial lane change icon 30 and the progressive lane change icon 32 can be progressively illuminated to provide an annunciation of an autonomous maneuver, and additionally, they can be configured to be viewed by both the driver of the vehicle and an adjacent vehicle to provide annunciation to other drivers that the vehicle is preforming an autonomous or manual maneuver.

Although the invention is shown and described in various embodiments, it is to be understood that it is not intended to be limited to the specific embodiments set forth above. Rather, it is recognized that modifications may be made by one of skill in the art of the invention without departing from the spirit or intent of the invention and, therefore, the invention is to be taken as including all reasonable equivalents to the subject matter of the appended claims. The term plurality shall be understood to include one or more.

What is claimed is:

1. A mirror assembly for use within a mirror housing on an autonomous or semi-autonomous vehicle, comprising:
   a reflector for collecting and distributing emitted light to a plurality of at least three icon regions;
   a circuit board;
   a plurality of light sources mounted to the circuit board and positioned to selectively emit light to illuminate the icon regions, wherein the circuit board provides selective illumination of the icon regions via the light sources in response to one or more signal inputs receivable from an autonomous or semi-autonomous vehicle indicating an imminent autonomous vehicle maneuver;
   a mirror having a front surface and a rear surface, wherein the reflector is secured at least indirectly to the rear surface; and
   a plurality of icons visible along a driver viewing axis relative to the front surface of the mirror during illumination, wherein the plurality of icons are positioned over the icon regions to allow for selective icon illumination via a selected icon region;
   wherein the reflector includes baffle walls, each extending substantially perpendicular to the circuit board, and wherein the icon regions are only partially enclosed by the baffle walls and light from a selected one of the plurality of light sources is directed by at least one of converging facets and refocusing facets situated along a reflector inner surface, to illuminate a selected icon without illuminating a non-selected icon situated adjacent to the selected icon.

2. The mirror assembly of claim 1, wherein two or more of the plurality of icons are sequentially illuminated in response to the one or more signal inputs.

3. The mirror assembly of claim 2, wherein the two or more of the plurality of icons are illuminated with progressively increasing intensity during sequential illumination.

4. The mirror assembly of claim 2, wherein the time duration of constant illumination of the plurality of icons is progressively shortened as the sequence of illumination of the two or more of the plurality of icons progresses.

5. The mirror assembly of claim 2, wherein a sequencing rate and illumination intensity are both increased as the imminent autonomous vehicle maneuver becomes increasingly imminent.

6. The mirror assembly of claim 1, wherein in response to the one or more signal inputs, two or more of the plurality of icons are flashed at an intensity that is progressively increased until the imminent autonomous vehicle maneuver is performed.

7. The mirror assembly of claim 1, wherein the imminent autonomous vehicle maneuver includes at least one autonomous maneuver being performed by the vehicle without driver assistance.

8. The mirror assembly of claim 7, wherein the plurality of icon regions are illuminated by a combination of converging facets and refocusing facets provided in the reflector, and wherein the plurality of icon regions include at least three icon regions that are not fully separated from each other.

9. The mirror assembly of claim 8, wherein at least one of the plurality of light sources includes a multi-colored LED, and wherein at least one of the plurality of icon regions associated with the at least one of the plurality of light sources is illuminated with a different color based on the one or more signal inputs.

10. The mirror assembly of claim 7, wherein the circuit board includes a bottom side that faces the converging facets and refocusing facets and a top side that faces the mirror, and wherein the light sources are mounted on the bottom side to face the facets.

11. The mirror assembly of claim 10, wherein the plurality of icons are formed by ablation of a coating applied to at least one of a front surface and a rear surface of the mirror to allow reflected light from the light sources to pass through the mirror.

12. The mirror assembly of claim 8, wherein the plurality of icons include at least a base car icon, an initial lane change icon, and a progressive lane chance icon.

13. The mirror assembly of claim 12, wherein the plurality of icons further include a trailer icon in response to receiving a signal from the vehicle that a trailer has been connected and the vehicle has autonomously adjusted a blind spot sensor range.

14. The mirror assembly of claim 1, wherein the light sources are activated in a progressive timed sequence that includes at least a first timed sequence followed by a second timed sequence.

15. The mirror assembly of claim 1, wherein two or more of the plurality of icons are sequentially illuminated in response to the one or more received signal inputs indicating a single imminent autonomous vehicle maneuver.

16. The mirror assembly of claim 1, wherein a first icon of a plurality of icons is illuminated prior to the other of the plurality of icons prior to the imminent autonomous vehicle maneuver, and the other of the plurality of icons is illuminated with the first icon during performance of the imminent autonomous vehicle maneuver.

17. A mirror assembly for use within a mirror housing on an autonomous or semi-autonomous vehicle, comprising:
a reflector at least partially divided by baffle walls, and including converging facets and refocusing facets, wherein the combination of baffle walls, converging facets, and refocusing facets provide a plurality of icon regions, and wherein at least two icon regions are not completely separated from each other by baffle walls;
a circuit board with a top side and a bottom side;
a plurality of light sources mounted to the bottom side of the circuit board and positioned to selectively illuminate the icon regions, wherein the circuit board provides selective illumination of the icon regions via the light sources in response to one or more received signal inputs from an autonomous or semi-autonomous vehicle indicating an imminent autonomous vehicle maneuver;
a mirror having a front surface and a rear surface, wherein the reflector is secured at least indirectly to the rear surface, and wherein the bottom side of the circuit board faces away from the mirror; and
a plurality of icons visible along a driver viewing axis relative to the front surface of the mirror during illumination, wherein the icons are positioned over the icon regions to allow for selective icon illumination via a selected icon region.

18. The mirror assembly of claim 17, wherein the light sources are activated in a progressive timed sequence.

19. The mirror assembly of claim 18, wherein the progressive timed sequence includes at least a first timed sequence followed by a second timed sequence.

20. The mirror assembly of claim 17, wherein without input from a driver, two or more of the plurality of icons are sequentially illuminated in response to the one or more signal inputs indicating a single imminent autonomous vehicle maneuver is to be performed by the vehicle.

21. A mirror assembly for use within a mirror housing on an autonomous or semi-autonomous vehicle, comprising:
a reflector for collecting and distributing emitted light to a plurality of icon regions;
a circuit board situated between the reflector and the mirror, and including a top side and a bottom side;
a plurality of light sources mounted on the bottom side of the circuit board and positioned to emit direct light in a direction opposite the rear surface of the mirror and to selectively emit light to illuminate the icon regions, wherein the circuit board provides selective illumination of the icon regions via the light sources in response to one or more signal inputs receivable from an autonomous or semi-autonomous vehicle indicating an imminent autonomous vehicle maneuver;
a mirror having a front surface and a rear surface, wherein the reflector is secured at least indirectly to the rear surface; and
a plurality of icons visible along a driver viewing axis relative to the front surface of the mirror during illumination, wherein the plurality of icons are positioned over the icon regions to allow for selective icon illumination via a selected icon region; wherein the reflector includes a plurality of curved baffle walls extending substantially perpendicular to the rear surface of the mirror and at least partially intersecting two icon regions.

\* \* \* \* \*